United States Patent

Bohn

[11] Patent Number: 5,248,102
[45] Date of Patent: Sep. 28, 1993

[54] DEVICE FOR HANDLING EMPTY BEVERAGE CONTAINERS

[75] Inventor: Torgrim Bøhn, Drammen, Norway
[73] Assignee: Tomra Systems A/S, Asker, Norway
[21] Appl. No.: 898,515
[22] Filed: Jun. 15, 1992
[51] Int. Cl.⁵ ............................................ B02C 19/14
[52] U.S. Cl. ..................... 241/99; 241/100; 241/DIG. 38
[58] Field of Search ............... 241/99, 100, DIG. 38, 241/81; 209/525

[56] References Cited

U.S. PATENT DOCUMENTS

| | | | |
|---|---|---|---|
| 3,667,693 | 6/1972 | Leeds et al. | 241/99 |
| 3,857,334 | 12/1975 | Arp | 100/53 |
| 4,102,263 | 7/1978 | Forsberg | 100/74 |
| 4,285,426 | 8/1981 | Cahill | 194/4 |
| 4,373,435 | 2/1983 | Grevich | 100/49 |
| 4,625,107 | 11/1986 | Planke | 250/223 B |
| 4,642,470 | 2/1987 | Planke | 250/566 |
| 4,786,000 | 11/1988 | Weil et al. | 241/36 |
| 5,165,610 | 11/1992 | Pendelton | 241/79 |
| 5,167,184 | 12/1992 | Rebecchi | 100/9 |

Primary Examiner—Timothy V. Eley
Assistant Examiner—John M. Husar
Attorney, Agent, or Firm—Rodman & Rodman

[57] ABSTRACT

A device for handling empty beverage containers, comprising a rotatable revolver-type barrel with a plurality of container receiving compartments therein, means for rotating said revolver-type barrel, inlet means for entering a container into a compartment, means for detecting characteristic features of said containers upon rotation of said revolver-type barrel, means for comparing said detected features with predetermined feature data and to provide control signals as a function thereof, and two or more outlet means for discharging a container based on said control signals. Further, the device has means cooperating with at least one of said outlet means for compacting or crushing a container leaving said outlet means. Said comparing means includes means for calculating and presenting a possible redemption value for said container.

42 Claims, 11 Drawing Sheets

DEVICE FOR HANDLING EMPTY BEVERAGE CONTAINERS

The present invention relates to a device for handling empty beverage containers such as bottles or cans.

In the prior art, there are known numerous devices for handling empty beverage containers.

Such prior art devices are capable of e.g. distinguishing between different types of beverage containers, such as bottles made of glass or plastics, or cans of metal. Apart from being able to distinguish between different shapes of bottles, such prior art devices are also capable of detecting the colour of the material from which a bottle has been made and to detect cans which are recyclable and those which cannot be recycled, e.g. cans consisting of a mixture of different metals or metals which are not recyclable.

Further, there are known prior art devices for reading bar codes on e.g. a can.

Based on detected features of the beverage containers, the prior art devices are capable of classifying the type of beverage container and, if applicable, assign a redemption value to a particular container.

Also, it has been known various types of beverage container crushers for compacting the beverage container before being removed for further processing.

In a conventional device for handling empty beverages containers and for carrying out the detection of various features related to the containers, such a device requires substantial space and has a plurality of movable parts. Also, in processes for recycling, it is very important to clearly sort bottles made of clear glass, green glass or brown glass.

In view thereof, it has been a long felt need for a device for handling empty beverage containers which is able to fulfil most of the features known from the prior art devices and still yield a compact device having a minimum of movable parts and being pilfer proof.

A typical prior art device for detecting bottles of various types is known from U.S. Pat. No. 4,625,107.

A prior art device for detecting empty beverage cans is inter alia known from U.S. Pat. No. 4,642,470.

It is an object of the present application to provide a device which is capable of receiving empty beverage containers, whether bottles made of glass or plastics or beverage cans, and to distinguish between such containers which are acceptable and those which are not acceptable for recycling and/or a redemption to the customer delivering the empty beverage containers.

It is a further object of the invention to provide a device for handling empty beverage containers which is capable of sorting bottles of material of different colurs into respective cullet bins after the container has been crushed.

Still a further object of the invention is to provide a device which is capable of crushing empty beverage containers such as bottles made of glass.

The novel device, according to the invention, for handling empty beverage containers, comprises a rotatable revolver-type barrel with a plurality of container receiving compartments therein, means for rotating said revolver-type barrel, inlet means for entering container into a compartment, means for detecting characteristic features of said containers at one or more positions during rotation of said revolver type barrel, means for comparing said detected features with predetermined feature data and to provide control signals as a function thereof, and one or more outlet means for discharging a container based on said control signals.

According to a further embodiment, the device includes means cooperating with at least one of said outlet means for compacting or crushing a container leaving said outlet means.

According to an even further embodiment said comparing means includes means for calculating and presenting a possible redemption value for said container.

Also, the said device could include means cooperating with at least one of said outlet means for compacting, cutting or crushing a container leaving said outlet means, and with said comparing means including a processing means for calculating and providing a redemption value for said container.

Suitably, said revolver-type barrel has its axis of rotation at an angle to the horizontal. The angle is suitable 30° to the horizontal. Thus the containers will remain stable in the bottom of the compartments.

The detected features are one or more from the group of containing shape, dimensions, type of material, colour of material, code indicia located on the container surface, code indicia embedded within the container material, spurious elements within the container.

According to a preferred embodiment of the present device, said revolver-type barrel has a front face, a rear face and a circumferential surface with compartment apertures, said front face having located in front thereof first means for shielding said revolver-type barrel front face and with a container inlet hole located in said first shielding means, said rear face having second means for shielding the rear of said revolver-type barrel and with one or more of holes in said second shielding member cooperating and aligned with said outlet means, and said circumferential surface having an adjacent wall section extending over at least the lower 180° of said surface.

According to a further feature of the present device, said container receiving compartments at a region adjacent to the axis of the revolver-type barrel are open, a stationary wall is located at an upper half section of the revolver-type barrel and forms a wall for said container receiving compartments at said regions thereof in said upper half section of the revolver-type barrel, and said stationary wall forms an angle with the axis of the revolver-type barrel.

Suitably, said means for detecting are located at a centre region of the revolver-type barrel and are capable of detecting a container through an opening region of said container receiving compartments as they pass through a region below the axis of rotation of said revolver-type barrel.

Also, said means for detecting could be located at the inlet means.

The outlet means includes a controllable gate and a container conveying duct.

Further, said outlet means include outlets for one or more of the group of: non-acceptable objects or containers of any material to be returned to a device user, containers of recyclable material such as metal, glass or plastics, refillable containers, containers having a redemption value or no redemption value.

The said compacting or crushing means suitably includes a spring loaded peg fired transversely of the container to be compacted or crushed.

The invention is now to be further described in the description below with reference to the enclosed drawings illustrating a preferred embodiment of the invention forming a non-limitative example of the inventive device.

Figure 8:
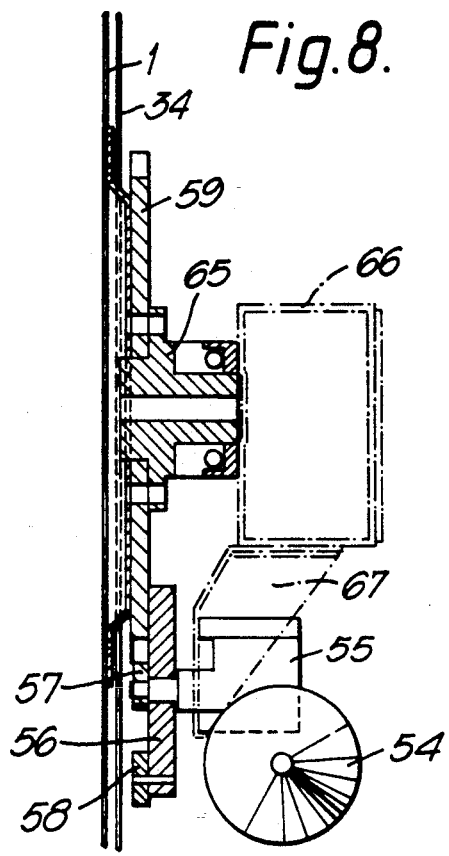
FIG. 8 is a side elevational view of a drive means for the revolver-type barrel of the device.
Figure 9:
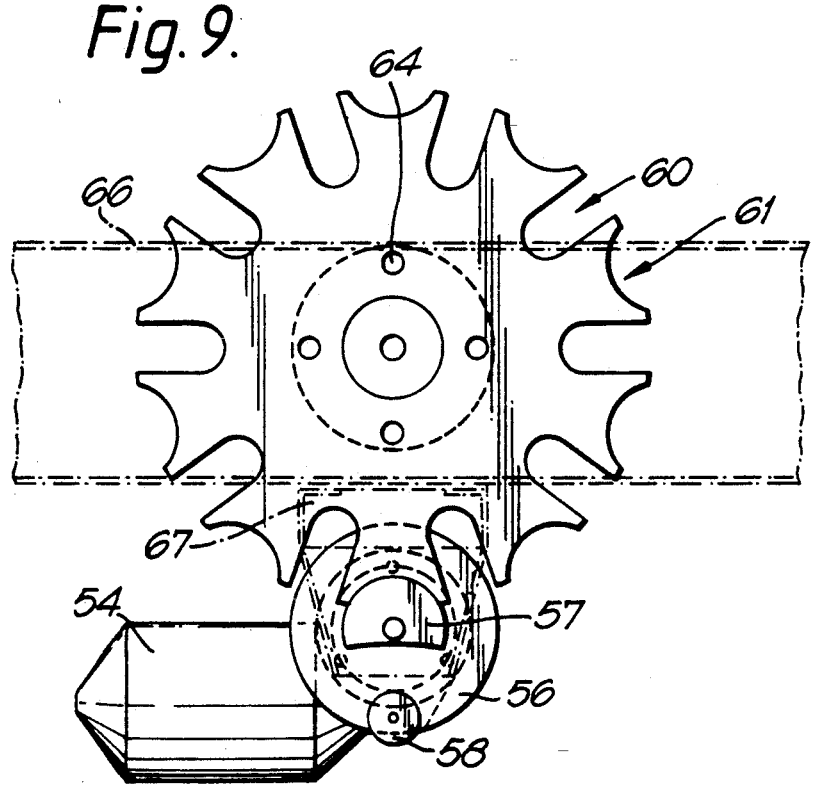
FIG. 9 is a front elevational view of the drive means of FIG. 8.

FIG. 10a–h illustrate the operation of the drive means shown in FIGS. 8 and 9.

Figure 11:
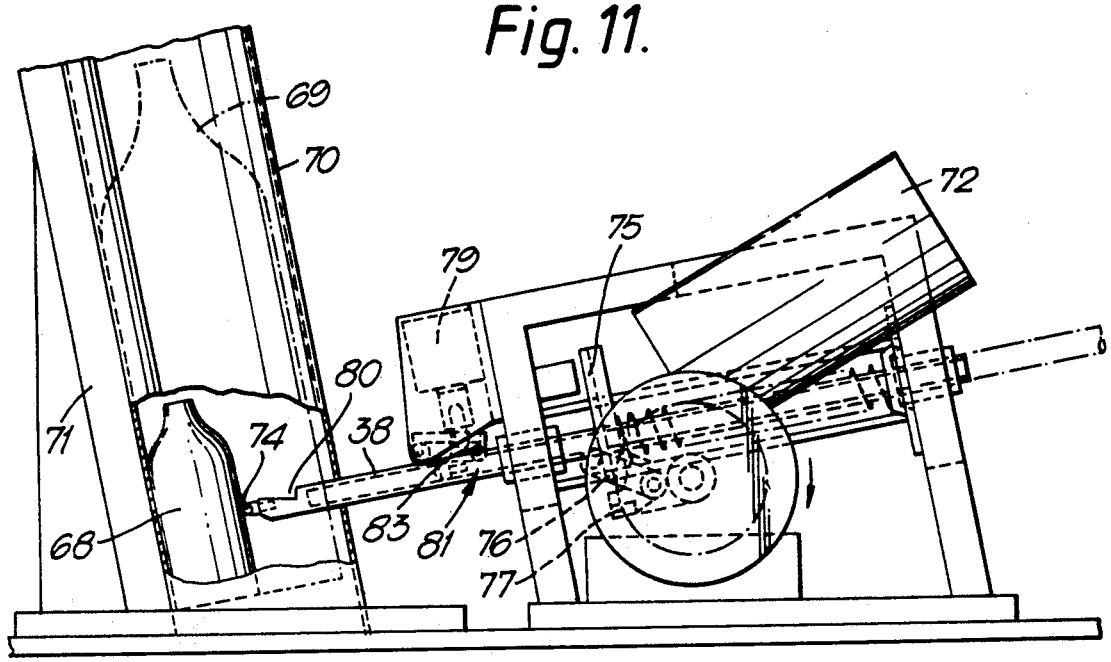

FIG. 11 is a detailed side view of the glass bottle crusher for use with the device according to the specification.

Figure 12:
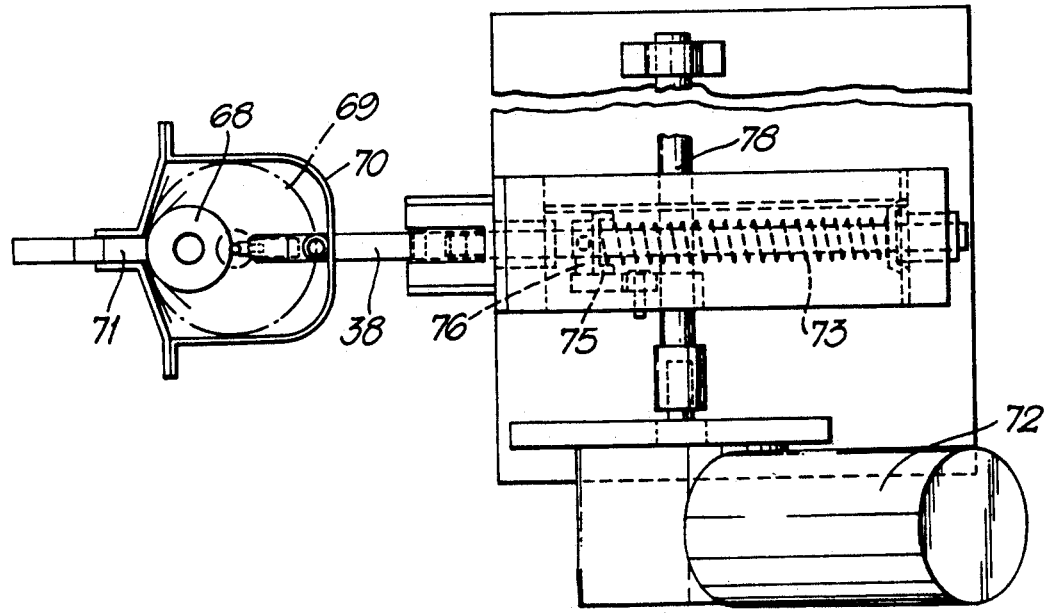

FIG. 12 is top plan view of the crusher according to FIG. 11.

Figure 13:
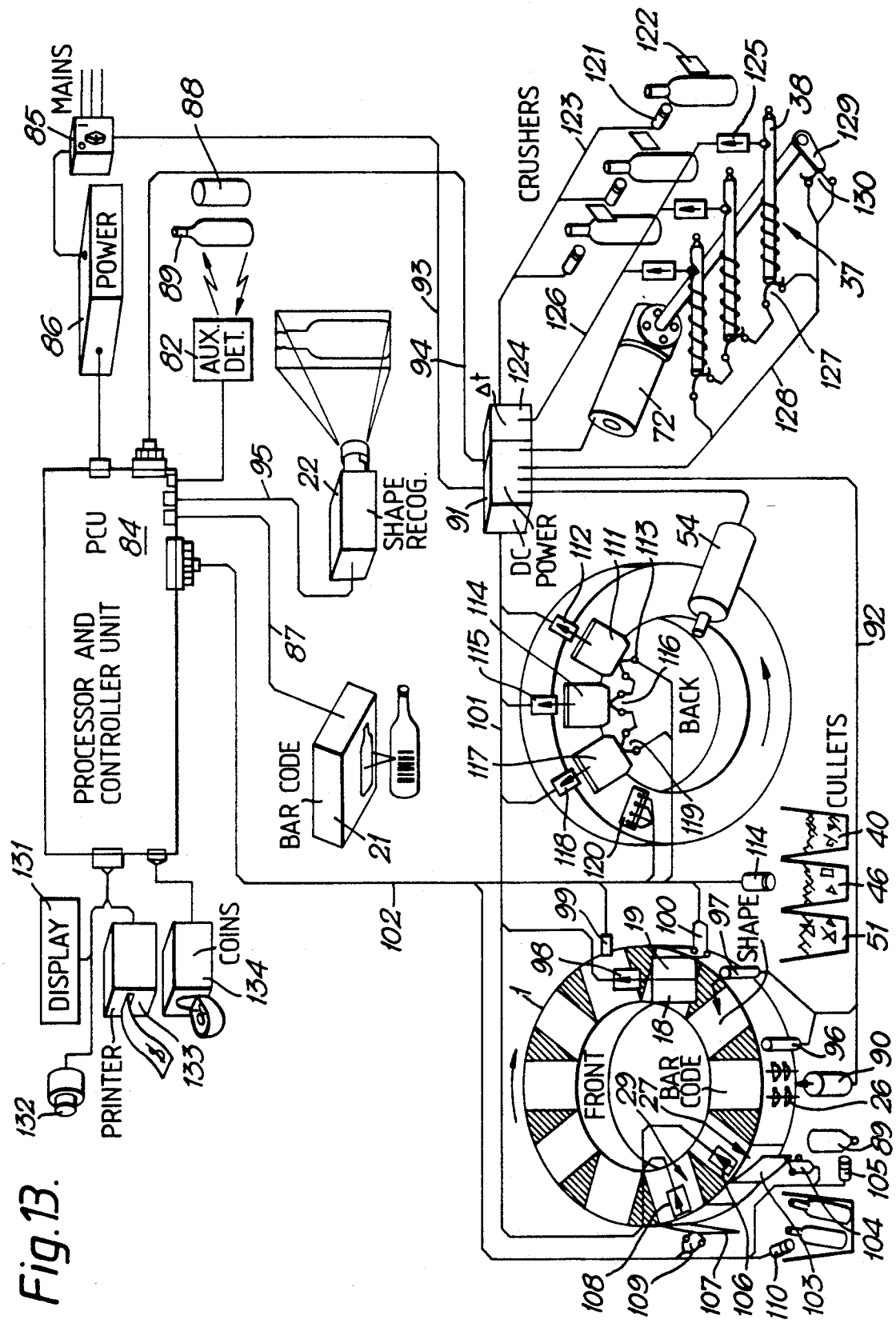

FIG. 13 is a functional schematic diagram of the device, according to the invention.

A rotatable barrel 1 of revolver-type is located in a cabinet 2 with the lower part 1' of the barrel 1 protruding out from the front face 2' of the cabinet. Apart from inlet means 3 for inserting an empty beverage container into a container receiving compartment in the barrel, the lower part 1' of the barrel is covered by a cover means 4.

Figure 1:
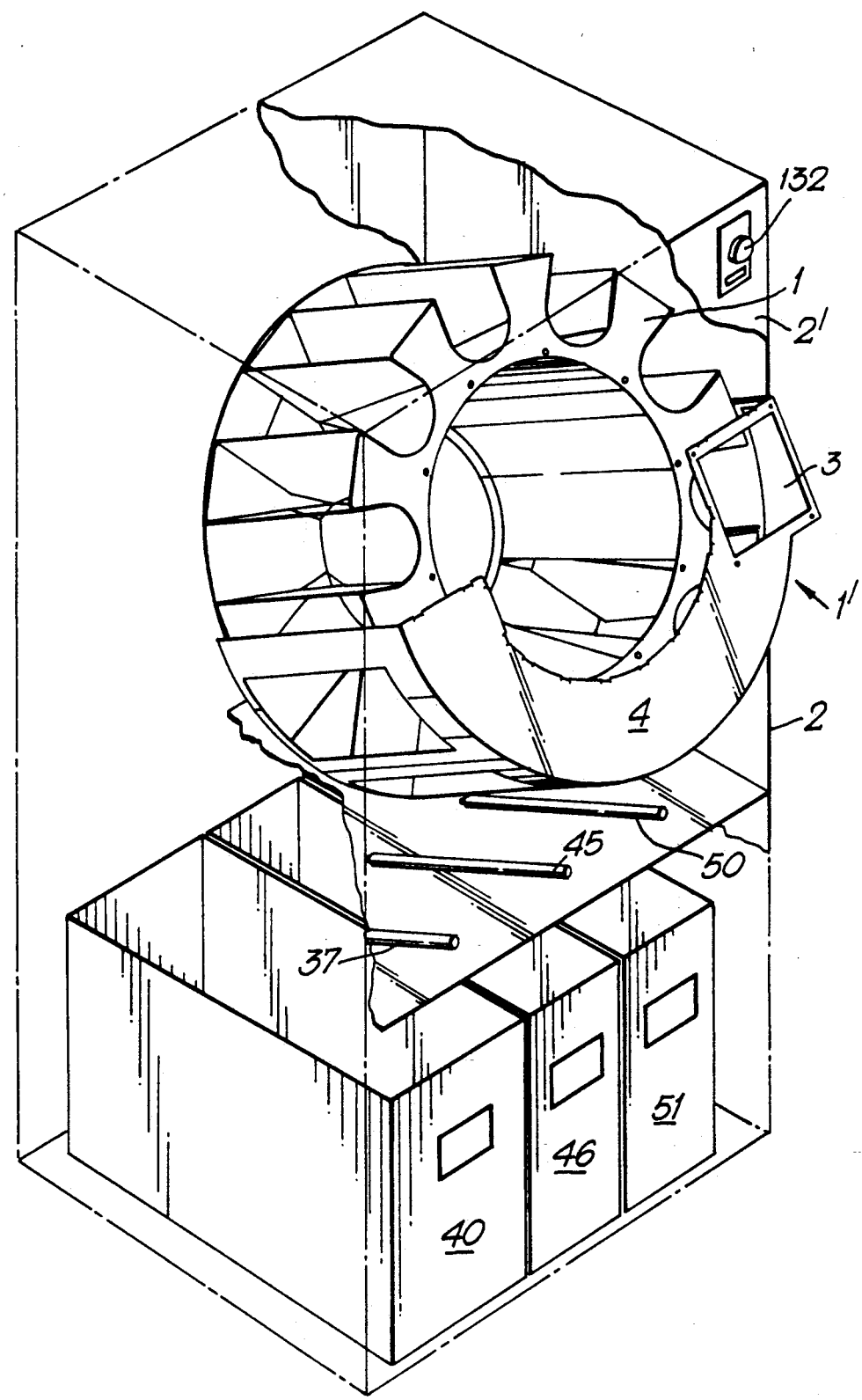
FIG. 1 is a simplified front perspective view of the device according to the present invention.
Figure 2:
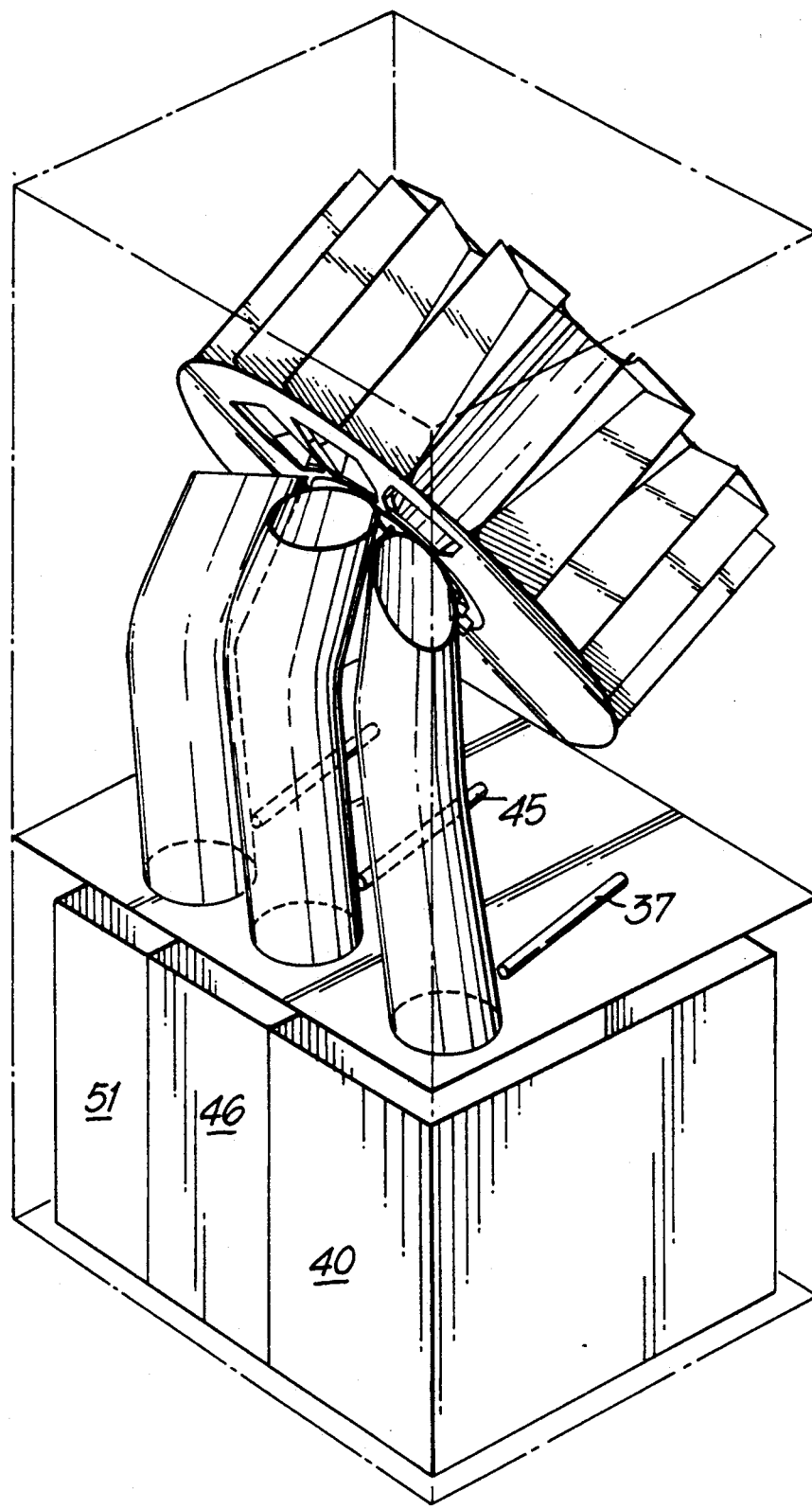
FIG. 2 is a rear simplified perspective view of the device according to the present invention.
Figure 4:
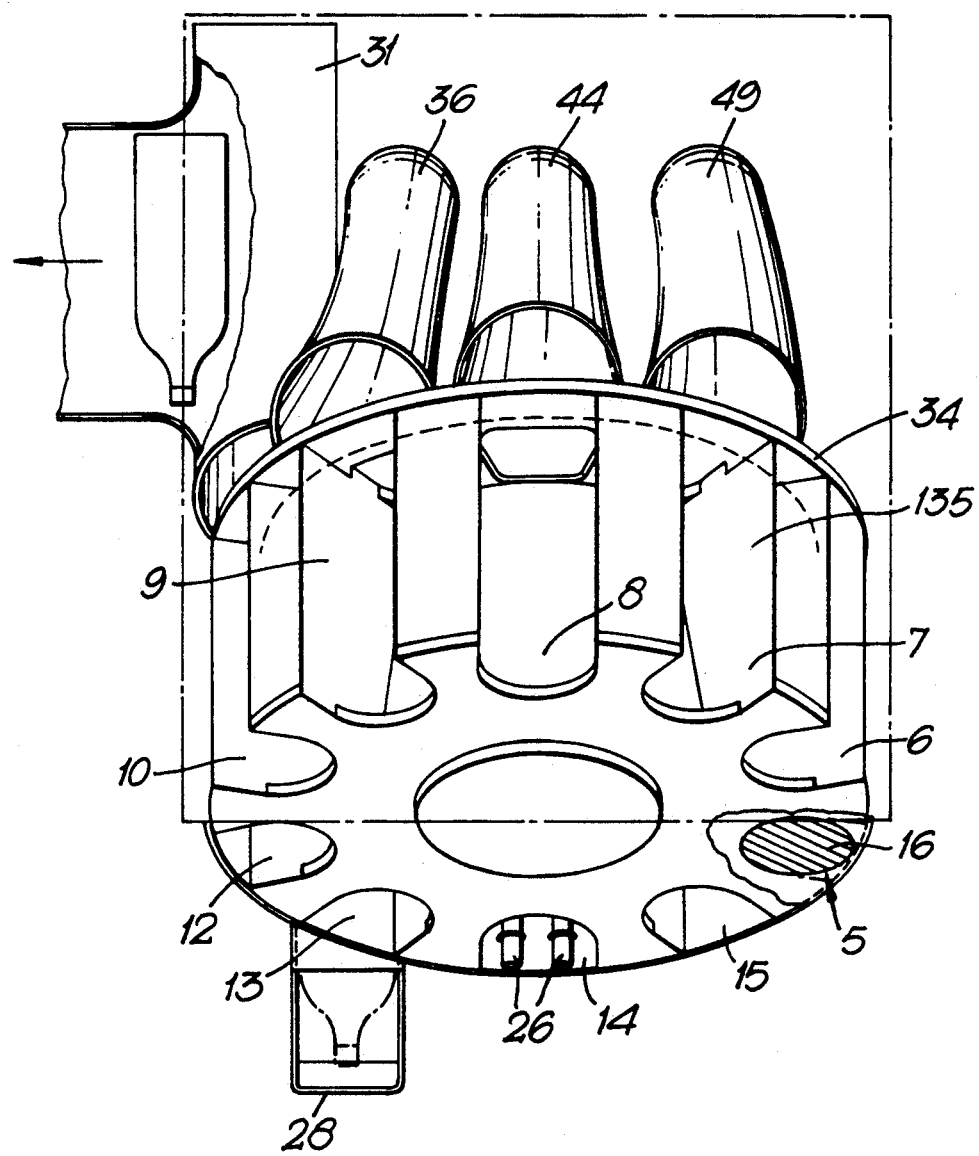
FIG. 4 is a top view of the device according to the present invention, however with some elements removed for clarity.
Figure 5:
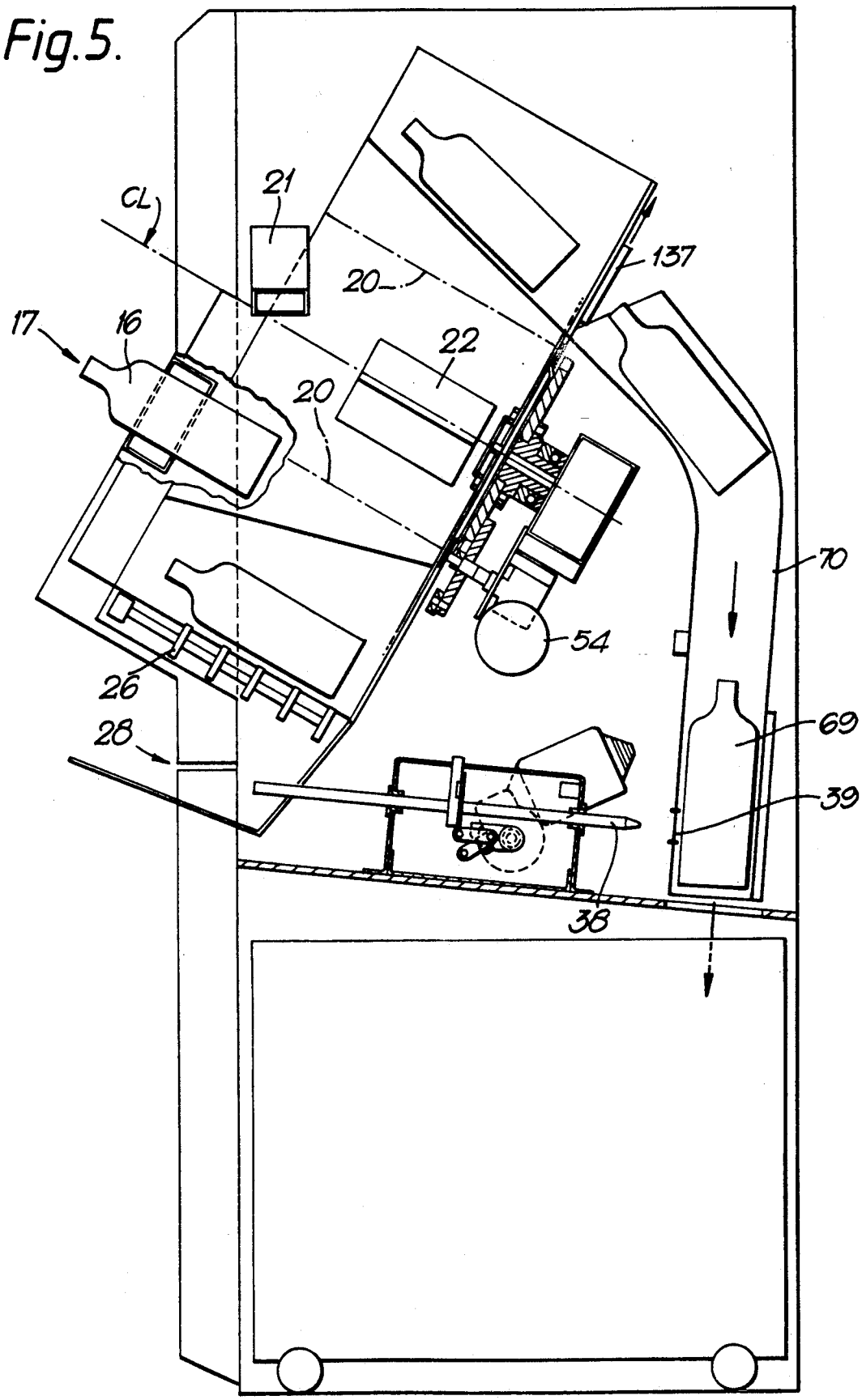
FIG. 5 is a side view of the device according to the invention, illustrated partly in section and partly with parts broken away, and including a glass bottle crusher.

The container receiving compartments are more clearly illustrated in FIG. 4 and have, as an example, respective reference numerals 5–15. When an empty beverage container 16, e.g. a can or bottle, is inserted into the inlet means 3 for entering the container into a compartment aligned with said inlet means 3, the barrel is rotated in clock-wise direction (as seen from FIG. 1) about an axis CL which forms an angle to the horizontal, as indicated in FIG. 5.

Figure 3:
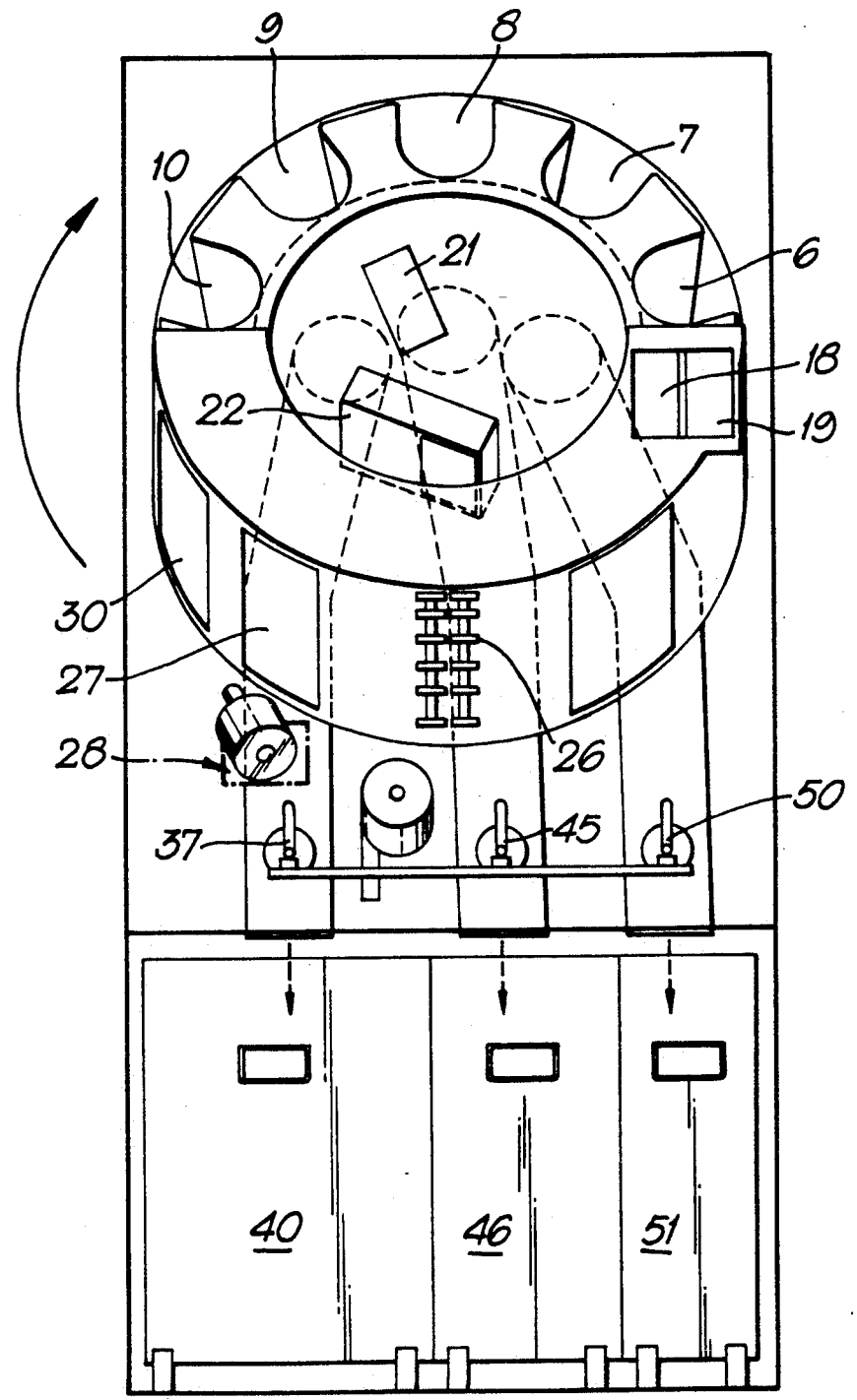
FIG. 3 is a front view of the device according to the present invention.

With reference to FIG. 3, the barrel 1 is rotated so that compartment 6 comes to the position which was previously held by the compartment 5, the latter having now moved to the previous position of the compartment 15.

Thus, every time an empty beverage container, schematically illustrated by the reference numeral 16 has been inserted into the compartment 5 as indicated by arrow 17, the barrel will turn one step to move the compartment 5 to the position which the compartment 15 previously had.

It will be appreciated that when the barrel turns, the fingers of a customer could very easily be stuck or jammed in the inlet means 3. In order to avoid such potential hazard, motor means (to be described later) for rotating the barrel 1 may be provided with motor halting means coacting with infeed gate members 18, 19 at said inlet means 3 to prevent the barrel from rotating. Said gate members 18, 19, e.g. two door blade have a mechanical interlock with the barrel for physically inhibiting movement of the barrel in case of electronics failure.

A central part of the barrel 1 is stationary and labelled 20 and has detection equipment 21, 22 for container inspection, said equipment being capable of determining container shape, container dimensions, type of material, colour of material, code indicia located on the container surface and possibly also spurious elements within the container. Said detection equipment is suitably a bar code reader 21 and a shape recognizer 22. Auxillary detectors 82 (FIG. 13) may be provided, e.g. for detecting type of metal in case of cans and colour of glass in case of bottles of glass.

Figure 6:
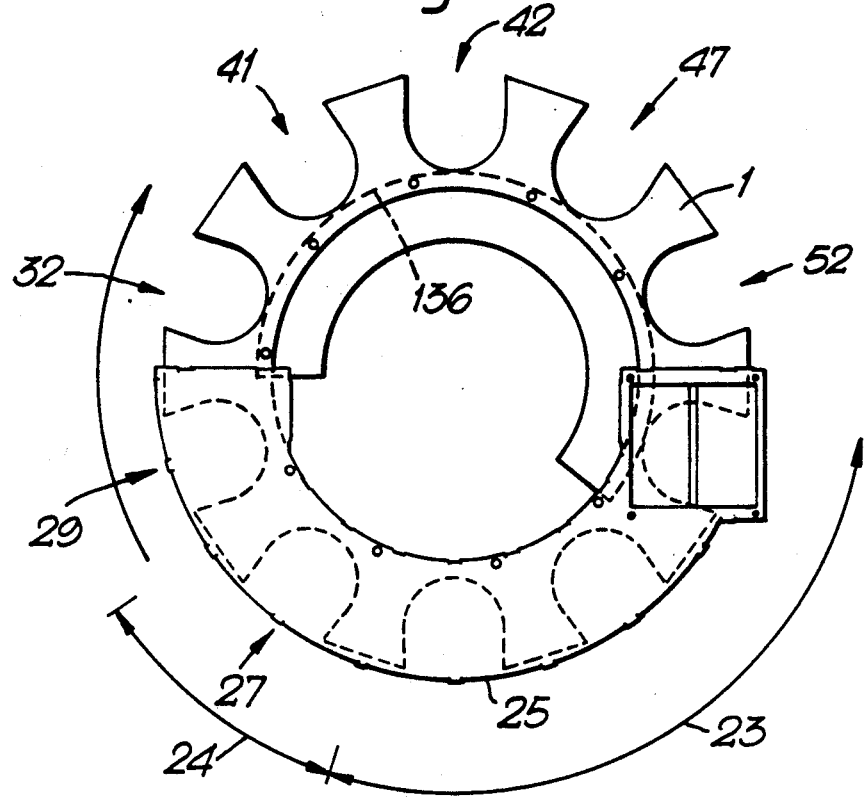
FIG. 6 is a front view of the rotatable revolver-type barrel of the device according to the invention.
Figure 7:
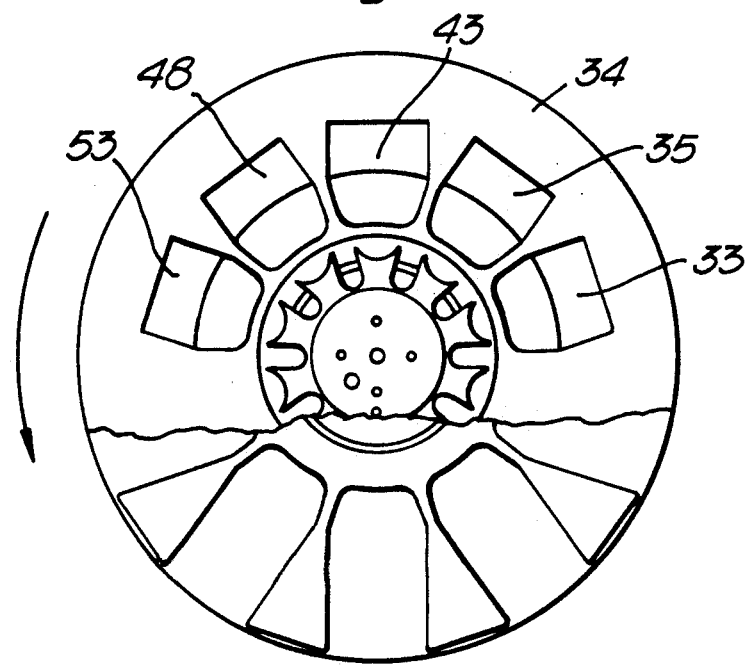
FIG. 7 is a rear view of the barrel of FIG. 6.

The primary detection takes place over the region indicated by reference numeral 23 in FIG. 6 and possible additional detection takes place over the region 24.

When the container moves over the distance labelled by reference numeral 23, it will be caused to rotate due to a roughened surface on the inside of a bottom stationary wall 25. Such roughening could be in the form of corrugations, regions etc. causing the container to move instead of sliding along the inside of the wall 25. In addition, spin rollers 26 could be provided in order to forcibly spin the container while being detected.

When the container passes over the distance 23, it is determined by said detection equipment 21, 22 whether the container 16 is a reject product to be returned to the customer or a product that is refillable or of a type to be recycled after crushing or compacting.

Thus, when the container reaches the position labelled by 14, e.g. reject station, a gate 27 will open in order to return the non-acceptable container to a rejection bay 28, as indicated in FIGS. 3, 4 and 5.

If the container is not of a reject type, then the gate 27 will not open and the container will consequently by next indexing or stepping pass to the next position indicated by reference numeral 29 in FIGS. 3 and 6. As seen in FIG. 3, a gate 30 is available at that location, and if it is detected by the detecting equipment 21, 22 that the container in question is of a refillable type, suitably a bottle of glass, then gate 30 will open to let the container in question pass through the refillable-type outfeed 31 (FIG. 4). If the container is not of the refillable-type, then the gate 30 will not open and the container will then pass to the next step of rotation indicated by reference numeral 32 in FIG. 6. In the preferred embodiment of the invention, that step 32 provides no exit possibilities for the container. Thus, gate 33 always remains closed, or is integrated in upper cover means 34. However, location 32 provides a spare exit in case e.g. for cans to be recycled or bottles of plastics material to be milled or compacted for recycling. If the container is a bottle of clear glass, then a gate 35 will open to deliver such bottle into the clear glass outfeed 36 and further into a first crusher station 37 having a spring loaded peg 38 acting through a hole 39 in said first crusher station. Thus, when the bottle enters the crusher station 37, its passage is detected, and when the bottle is immediately opposite the hole 39, the peg 38 is released and crushes the bottle upon impact with the bottle wall. The crushed bottle then falls into a first cullet bin 40 which is to contain crushed glass bottles of clear glass material.

If instead the container is a bottle of brown glass, such bottle will exit at the position indicated by reference numeral 42 in FIG. 6 when the barrel has rotated the container to that position. Thus, instead of the previous gate 35 opening, the gate 43 will open and thus convey the bottle to the brown glass outfeed 44. Similarly as explained in connection with the clear glass example, crushing takes place at crusher station 45 and the brown glass will drop into a cullet bin 46 provided for that type of glass. The second crusher station 45 is also associated with spring loaded peg of the type disclosed in FIG. 5. If the container is not of the brown type, but instead of the green glass-type, then it is passed to the position indicated by reference numeral 47 in FIG. 6 when the barrel is indexed one further step from step 42. Thus, the gates 35 and 43 as well as 33 will not have opened and instead gate 48 will open to pass the green glass bottle into the green glass outfeed 49 and into a green glass crusher station 50 cooperating with spring loaded peg of the type shown in FIG. 5. Thus, green glass will drop from the crusher station 50 into the cullet bin 51. The operation of the peg will be more fully described with reference to FIGS. 5, 11 and 12.

Next to location 47 is located 52 which forms a spare outlet 53 (not used) which could be used e.g. for cans to be recycled or bottles of plastics material to be compacted, shredded or cut into small particles for recycling. For sake of clarity, means for so restructuring such cans or bottles have not been shown on the drawings.

The barrel 1 is rotated by a motor 54 which rotates the barrel 1 via a gear 55, a rotatable dic 56, a circle segment member 57 coaxial with said disc 55, a circular member 58 located at a periphery location of the disc 56, and toothed gear 59 shaped like a maltese cross.

Figure 10A:
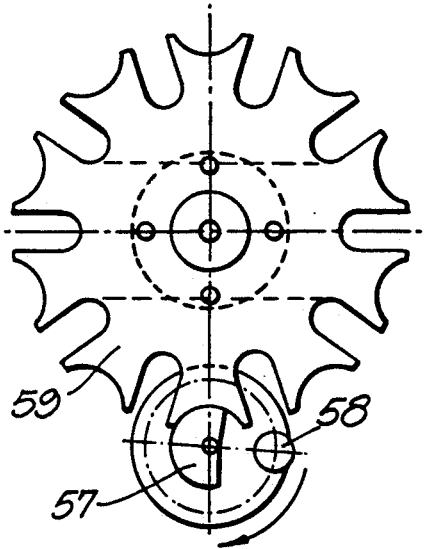
Figure 10B:
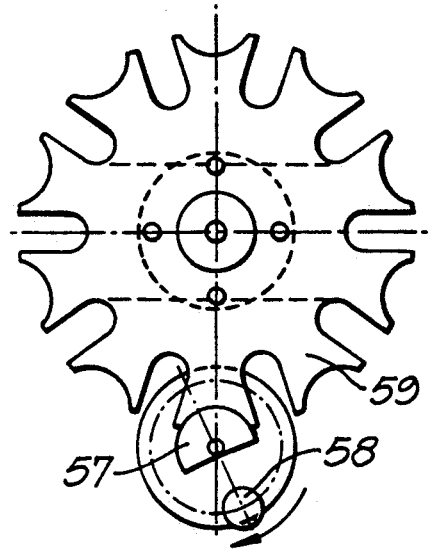
Figure 10C:
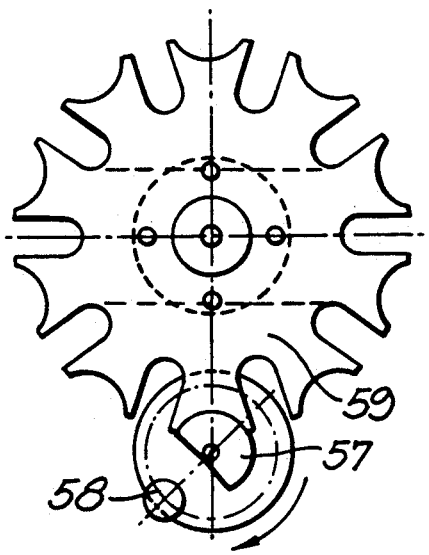
Figure 10D:
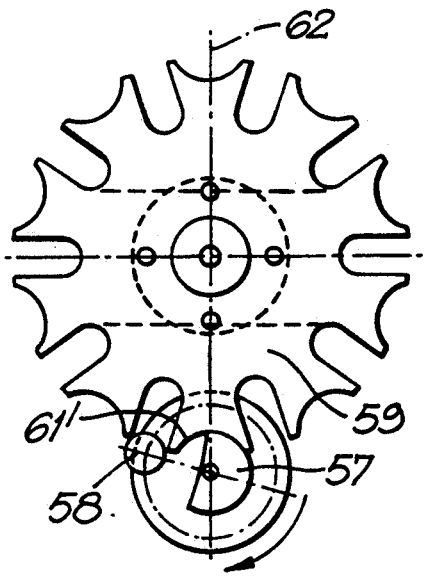
Figure 10E:
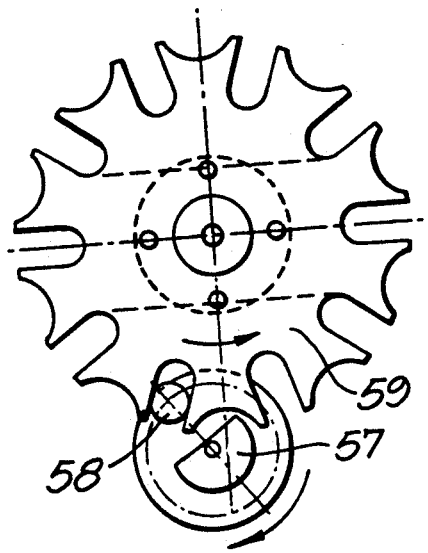
Figure 10F:
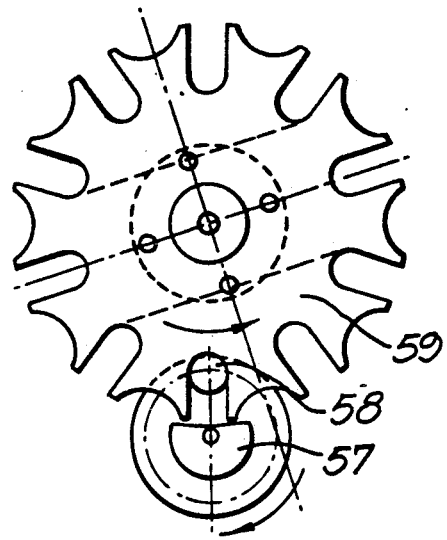
Figure 10G:
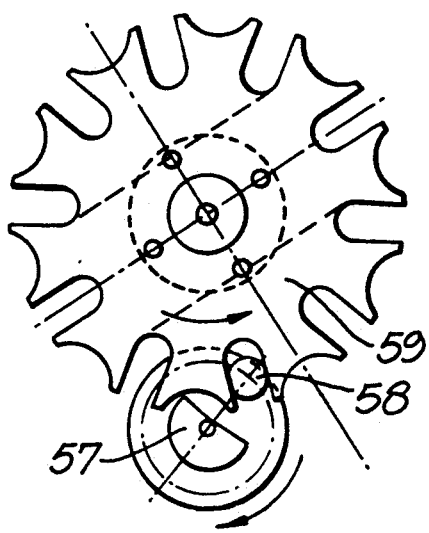
Figure 10H:
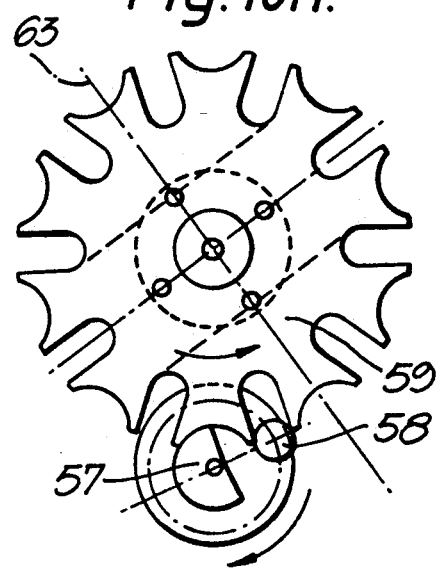

The maltese cross type gear 58 provides a controlled, non-slip step motion of the barrel 1 through interaction with said members 57, 58. The member 58 provides the actual turning of the gear 58 through interaction with deep type of recesses 60 as the disc 56 turns. As the disc 56 turns, the member 58 leaves the corresponding recess 60 as shown in FIG. 10h in order to enter later on the next recess 60 as indicated in FIG. 10d. The member 57 enters into slidable engagement with adjacent shallow type of recess 61, as indicated in FIG. 10h and FIGS. 10a-10d. FIG. 10 clearly demonstrates how the member 58 moves the gear 59 from the position 62 to the position 63 as indicated by FIGS. 10d-10h, and how the member 57 retains the gear 59 in a stationary position 62 as the member 58 moves from the position in FIG. 10h to the position in FIG. 10d by slidably engaging the adjacent recess 61' (see FIG. 10h).

Thus, it will be appreciated that there is provided a safely controlled step motion of the barrel 1.

The gear 59 is attached to the barrel 1 through a hole in the rear wall 34 by means of screws or rivets 64. The gear 59 is supported through a ball bearing type of mount 65 by first bracket means 66 attached to the cabinet 2, said first bracket means 66 further supporting said gear 55 and motor 54 by means of a second bracket means 67.

The operation of the crushers 37, 45 and 50 are now to be more fully described with reference to FIG. 5 and FIGS. 11, 12 and 13. As seen in FIGS. 5, 11 and 12, a bottle 69 passes through a glass feedout which could be anyone of those described earlier, but which for the purpose of exemplary explanation is labelled 70. The bottle could be of any size to fit inside the feedout 70, e.g. of the size of a smaller bottle labelled 68 in FIGS. 11 and 12. The inventive crusher has anvil means 71 so that the bottle, e.g. 68 or 69, comes between the anvil means 71 and the peg 38 during crushing action. The three crushers have suitably a common tensioning motor 72 and a common drive shaft 78 in order to tension the peg of each crusher after releasement of said peg, said peg being biased by a spring means 73 as indicated in FIG. 12. The peg 38 has a hard tip 74, suitably a small chisel. The peg has a fixedly attached tensioning plate member 75. A tensioning arm 76 which is so located that it will interact with said plate member 75 whenever the peg has been released. Upon turning of the the motor 72, a tensioning arm support means 77 fixedly attached to said shaft 78 will engage said arm means 76 which is hingedly connected to said support means 77. Thus, turning in the clockwise direction (see FIG. 11), the arm means 76 engages the plate member 75 and moves the peg to the right (as viewed in FIGS. 11 and 12). When the shaft has turned through approximately 180°, the peg will have reached its maximum tensioned state, and a release mechanism 79 engages a corresponding recess 80 on the peg 38, as indicated by the dashed lines 81 in FIG. 11. Simultaneously, there is no longer any engagement between the plate member 75 and the arm means 76, because the arm means is no longer supported by the support means 77. The release mechanism may include a solenoid to be operated whenever a bottle is detected in the feedout 70. The solenoid then retracts its engagement means 83 which engages the peg recess 80, thus releasing the peg 38 in order to hit a bottle to be crushed or shattered.

The overall device is now to be further explained with reference to FIG. 13.

The various functions of the device are operable by means of a processor and controller unit PCU 84 powered from the mains via a switch 85 and a power supply 86. The bar code reader 21 is connected to PCU 84 via line 87 and delivers bar code signals when a can 88 or bottle 89 is examined by the reader 21. In order to be able to detect a bar code on such item as a bottle or can, it is required to turn the item forcibly by spin rollers 26 powered by a motor 90, because such bar code or other applicable code could be located anywhere on the circumference of the item. The motor 90 is powered from a d.c. power source 91 via line 92, said source receiving its power via line 93 from switch 85. The d.c. power source is controlled by the PCU 84 via line 94.

The shape recognizer 22 is connected to PCU 84 via line 95 and is capable of providing an image of the item to the PCU 84, suitably a shadow image. The shape recognizer could be a CCD-camera or any technically equivalent means for forming said image. In order to obtain a proper image, the object must be illuminated from two longitudinal sides of the item, e.g. by light sources 96 and 97 powered via line 92. The light sources could be of the flash type to create reflexes from the container edges.

It will be fully appreciated that not every detail of the barrel 1 and the crushers 37, 45 and 50 are shown on FIG. 13 for sake of clarity.

The auxiliary detectors could be located e.g. at the inlet means 3, e.g. behind doors 18, 19 and could be able to detect e.g. type of material, such as single type of material or mixture of materials, colour of material, or detect spurious elements within the container. The doors 18, 19 are powered to open or close by a electromechanical device 98 such as a micro-servomotor or solenoid. When sensor 99 triggers PCU 84 by sensor 99 having detected region 52 (see FIG. 6) being empty of any container or object, device 98 is powered via line 101 from source 91 to release doors 18, 19. After a container is entered, the doors 18, 19 will close unless prevented to do so forcibly. The barrel 1 will not turn until doors 18, 19 are fully closed as detected by switch 100. Switches 99 and 100 are connected to PCU 84 via line 102.

If the container is rejectable, it is delivered at location 27 (FIG. 6) through gate 103 operable by electromechanical device 106 via line 101. Switch 104 signals to PCU 84 whenever the gate 103 is open, and device 106 closes gate 103 when the rejected container is removed from the collection bay 28. The rejected container is detected by photodetector 105. Detector 105 signals via line 102 to PCU 84.

If the container is of reusable type, it is to be fed out at location 29 (see FIG. 6). Gate 107 is controlled by electromechanical device 108, and switch 109 signals via line 102 to PCU when gate 107 is fully open. As soon as the container exits location 29 past gate 107, then it is detected by photodetector 110, which then signals to PCU 84 via line 102 to close gate 107. Photodetector 110 is also capable of providing a "full bin" alarm to PCU 84.

Similarly, when a bottle is e.g. of clear glass, it is to exit at location 41 (FIG. 6). Gate 111 then opens by means of electromechanical device 112 and whether the gate is closed or not is controlled by switch 113. After the bottle leaves location 41 and is smashed by crusher 37, its cullets will be detected by photodetector 114 as they enter cullet bin 40. Signals then pass to PCU 84 to close gate 84. Then, motor 54 will turn barrel one step forward, as in all other incidents when a container leaves a compartment of the barrel. The motor is powered by source 91 via line 121. Similar operation as for gate 111 applies for gate 114, its electromechanical device 115 and switch 116, and for gate 117 with its associated electromechanical device 118 and switch 119, in the case of green and brown glassware, respectively.

As seen from FIG. 13 at location 52 (FIG. 6) there is provided a spare connector 120 for connection with switches, detectors etc. in case containers are to exit from said location 52. Alternatively, connector 120 could be used to detect that location 52 is empty and give a 4-bit position signal of the revolving barrel.

When a bottle 89 leaves e.g. location 41 through gate 111 its passage through feedout 36 will be detected by photodetector 121 when a light beam normally reflected by mirror 122 is interrupted. Detector 121 signals bottle passage via line 123 to delay unit 124, which after a preset time activates solenoid 125 via line 126 to disengage peg 38, thus releasing peg 38 to hit bottle through spring power, as explained earlier. Such releasing causes switch 127 to open, signalling to power source 91 via line 128 turn peg tensioning motor 72 one turn. Thus, as described earlier, the peg 38 is brought back to the tensioned, stand-by state. The motor 72 stops when cam 129 closes switch 130.

Thus priming or tensioning of the pegs can be done by means of a single motor 72, and tensioning can be made simultaneously or individually for the crushers.

The remaining two crushers 45 and 50 have identical operation to that already described for crusher 37, and their operation is therefore not explained. Thus the crusher station consists of three identical units with a common motor. Each unit has a sensor for detecting falling bottles. The signal commands an associated solenoid to fire the peg into the bottle by the time it reaches the right position, e.g. 0.1 seconds or less. The time will be dependent on the distance from the sensor to the peg position and the falling pattern of different bottles. When a peg fires, the peg rod detector (switch) at the end of the peg commands the motor to make a single revolution of the motor shaft. The cam sensor looks for correct position in order to avoid pegs being fired in an intermediate position of the tensioning arm means, as such firing could easily jam the mechanics. The motor will tension or crank all fired pegs in one revolution, yielding different loads and calling therefore for a controlled stop. The crusher is in no need of start signals from PCU 84, as sequences will be initiated by the falling bottles.

When a gate sensor is activated, the system will cause the barrel not to turn and, if applicable, cause crusher peg to be fired.

PCU 84 has a display 131 for guiding a customer or service personal, an operation button 132 for customer use, a printer 133 for writing a receipt for the redemption value of accepted containers and/or a coin dispenser 134 delivering coins corresponding to the redemption value of containers delivered by a customer.

Thus, when the customer has put all of his or hers empty beverage containers into the inlet 3, then the depressing of a button 132 for initiating printout of a receipt from the printer 133 or payout from coin dispenser 134 will cause the barrel 1 to run all containers past the inspection area 23 in order to give the correct refund to a customer. Then the overall system will clear itself of all containers. However, in the state of operation when the device receives a number of containers in succession, the barrel will index one step each time another container is entered into the inlet means 3.

Each of the compartments 5–15 have side walls 135 as more clearly illustrated in FIG. 4. The walls 135 taper in the forward direction. It is noted from FIG. 6 that there is present an upper wall 136 which extends over an angle of approximately 210° contrary to the wall 25 which extends over an angle of approximately 180°. The wall 136 forms in fact the bottom of the compartments at locations 41, 42, 47 and 52, and the wall 136 is tapered rearwardly so that the diameter of the wall is smaller at the rear of the barrel than at the front of the barrel. In view of the compartments having no bottom but only sidewalls 135 which are also tapering from the rear to the front, the wall 25 forms the bottom of the compartments over the lower 180° of the barrel, whereas the upper wall 135 forms the bottom of the compartments over at least upper 180° of the barrel 1.

Thus, as clearly seen from FIG. 5, when the containers 7 reach the upper half of the barrel, the containers are becoming into a position which is at an inclination of approximately 45°, thus providing the best position for exit into e.g. outfeed, generally denoted 70 through gate, generally denoted 137 and then further to the crushing station, e.g. 37, where the peg 38 is capable of hitting the side of the bottle 69 to crush the bottle, so that culletts thereof fall into a cullet bin, e.g. 40.

Over the region 23 or part thereof, as indicated in FIG. 6, it would be suitable to detect e.g. the presence of metal in the container and the region at the inlet means could also include detection of any ring code on the container being fed into the device.

Although bar code scanning has been discussed, it should be recognized that such code scanning could be e.g. UPC, EAN or special code, e.g. ring code.

By the term line, it is in this context to be understood to represent a multi-wire line or cable for conveying several independent signals or power supplies.

The present device provides a highly compact and still quite versatile device for handling empty beverages containers in that it can be used for handling any type of known beverage container.

The device has one main movable part, viz. the barrel 1 and some minor components operable therewith. The present invention provides a great flexibility with respect to new and unknown containers to be processed by the device.

While the customer is feeding the device with containers, the barrel is indexed only one step at the time until button 132 is depressed.

The present device is highly suitable both for use indoors or outdoors and has the great advantage over the prior art devices that it not only detects and calculates a refund value based on those detected features, but also is able to sort the various detected containers, e.g. bottles of different glass material, and even crush some types of containers.

The crusher requires small amounts of energy to operate, is light, small and compact and provides large pieces of cullets with a minimum of glass dust.

The present invention is not to be restricted to the embodiments shown and described, and any expert in the art will appreciate that variations and modifications can be made without departing from the inventive concept of the present invention as described and claimed in the attached patent claims.

I claim:

1. A device for handling empty beverage containers, comprising
   a rotatable revolver-type barrel with a plurality of container receiving compartments therein, said revolver-type barrel having an axis of rotation at an acute angle to the horizontal,
   means for rotating said revolver-type barrel about said axis of rotation,
   inlet means for entering a container into a compartment,
   means for detecting characteristic features of said containers at one or more positions during rotation of said revolver-type barrel,
   means for comparing said detected features with predetermined feature data and to provide control signals as function thereof, and
   one or more outlet means for discharging a container based on said control signals.

2. A device according to claim 1, including means for detecting one or more features selected from the group consisting of container shape, container dimensions, type of material, colour of the material, code indicia located on the container surface, code indicia embedded within the container material, spurious elements within the container, and combinations thereof.

3. A device according to claim 1, wherein said revolver-type barrel has a front face, a rear face and a circumferential surface with compartment apertures, said front face having located in front thereof first means for shielding said revolver-type barrel front face and with a container inlet hole located in said first shielding means, said rear face having second means for shielding the rear of said revolver-type barrel and with one or more holes in said second shielding member cooperating and aligned with said outlet means, and said circumferential surface having an adjacent wall section extending over at least the lower 180° of said surface.

4. A device according to claim 1, wherein said container receiving compartments at a region thereof adjacent to the axis of the revolver-type barrel are open, wherein a stationary wall is located at an upper half section of the revolver-type barrel and forms a wall for said container receiving compartments at said regions thereof in said upper half section of the revolver-type barrel, and wherein said stationary wall forms an angle with the axis of the revolver-type barrel.

5. A device according to claim 1, wherein said means for detecting being located at a centre region of the revolver-type barrel and capable of detecting a container through an open region of said container receiving compartments as they pass through a region below the axis of rotation of said revolver-type barrel.

6. A device according to claim 1, wherein said means for detecting being located at the inlet means.

7. A device according to claim 1, wherein said outlet means includes a controllable gate and a container conveying duct.

8. A device according to claim 1, wherein said outlet means include outlets for non-acceptable objects or containers of any material, to be delivered back to a customer operating the device.

9. A device according to claim 1, wherein in said means for rotating said revolver-type barrel includes motor means, gear means interconnecting the motor means with rotatable disc means, said disc means having a first circle-segment member coaxially and fixedly attached thereto and a second circular member pivotally attached to said disc means, and a toothed gear wheel shaped like a maltese cross having a plurality of shallow recesses each for slidably engaging said first member when adjacent thereto, and a plurality of deep recesses alternating with said shallow recesses, each of said deep recesses in turn engageable with said second member for advancing said barrel in steps, and said shallow recess and first member retaining the barrel stationary between such step movements.

10. A device for handling empty beverage containers, comprising
    a rotatable revolver-type barrel with a plurality of container receiving compartments therein, said revolver-type barrel having an axis of rotation at an acute angle to the horizontal,
    means for rotating said revolver-type barrel about said axis of rotation,
    inlet means for entering a container into a compartment,
    means for detecting characteristic features of said containers at one or more positions during rotation of said revolver-type barrel,
    means for comparing said detected features with predetermined feature data and to provide control signals as function thereof,
    one or more outlet means for discharging a container based on said control signals, and
    means cooperating with at least one of said outlet means for volume reduction of a container leaving said outlet means.

11. A device according to claim 10, including means for detecting one or more features selected from the group consisting of container shape, container dimensions, type of material, colour of the material, code indicia located on the container surface, code indicia embedded within the container material, spurious elements within the container, and combinations thereof.

12. A device according to claim 10, wherein said revolver-type barrel has a front face, a rear face and a circumferential surface with compartment apertures, said front face having located in front thereof first means for shielding said revolver-type barrel front face and with a container inlet hole located in said first shielding means, said rear face having second means for shielding the rear of said revolver-type barrel and with one ore more holes in said second shielding member cooperating and aligned with said outlet means, and said circumferential surface having an adjacent wall section extending over at least the lower 180° of said surface.

13. A device according to claim 10, wherein said container receiving compartments at a region thereof adjacent to the axis of the revolver-type barrel are open, wherein a stationary wall is located at an upper half section of the revolver-type barrel and forms a wall for said container receiving compartments at said regions thereof in said upper half section of the revolver-type barrel, and wherein said stationary wall forms an angle with the axis of the revolver-type barrel.

14. A device according to claim 10, wherein said means for detecting being located at a centre region of the revolver-type barrel and capable of detecting a container through an open region of said container receiving compartments as they pass through a region below the axis of rotation of said revolver-type barrel.

15. A device according to claim 10, wherein said means for detecting being located at the inlet means.

16. A device according to claim 10, wherein said outlet means includes a controllable gate and a container conveying duct.

17. A device according to claim 10, wherein said volume reduction means includes a spring loaded peg fired transversely of the container.

18. A device according to claim 10, wherein said outlet means include outlets for non-acceptable objects or containers of any material, to be delivered back to a customer operating the device.

19. A device according to claim 10, wherein in said means for rotating said revolver-type barrel includes motor means, gear means interconnecting the motor means with rotatable disc means, said disc means having a first circle-segment member coaxially and fixedly attached thereto and a second circular member pivotally attached to said disc means, and a toothed gear wheel shaped like a maltese cross having a plurality of shallow recesses each for slidably engaging said first member when adjacent thereto, and a plurality of deep recesses alternating with said shallow recesses, each of said deep recesses in turn engageable with said second member for advancing said barrel in steps, and said shallow recess and first member retaining the barrel stationary between such step movements.

20. A device for handling empty beverage containers, comprising
 a rotatable revolver-type barrel with a plurality of container receiving compartments therein, said revolver-type barrel having an axis of rotation at an acute angle to the horizontal,
 means for rotating said revolver-type barrel about said axis of rotation,
 inlet means for entering a container into a compartment,
 means for detecting characteristic features of said containers at one or more positions during rotation of said revolver-type barrel,
 means for comparing said detected features with predetermined feature data and to provide control signals as function thereof,
 one or more outlet means for discharging a container based on said control signals, and
 said comparing means including means for calculating and providing a possible redemption value for said container.

21. A device according to claim 20, including means for detecting one or more features selected from the group consisting of container shape, container dimensions, type of material, colour of the material, code indicia located on the container surface, code indicia embedded within the container material, spurious elements within the container, and combinations thereof.

22. A device according to claim 20, wherein said revolver-type barrel has a front face, a rear face and a circumferential surface with compartment apertures, said front face having located in front thereof first means for shielding said revolver-type barrel front face and with a container inlet hole located in said first shielding means, said rear face having second means for shielding the rear of said revolver-type barrel and with one or more holes in said second shielding member cooperating and aligned with said outlet means, and said circumferential surface having an adjacent wall section extending over at least the lower 180° of said surface.

23. A device according to claim 20, wherein said container receiving compartments at a region thereof adjacent to the axis of the revolver-type barrel are open, wherein a stationary wall is located at an upper half section of the revolver-type barrel and forms a wall for said container receiving compartments at said regions thereof in said upper half section of the revolver-type barrel, and wherein said stationary wall forms an angle with the axis of the revolver-type barrel.

24. A device according to claim 20, wherein said means for detecting being located at a centre region of the revolver-type barrel and capable of detecting a container through an open region of said container receiving compartments as they pass through a region below the axis of rotation of said revolver-type barrel.

25. A device according to claim 20, wherein said means for detecting being located at the inlet means.

26. A device according to claim 20, wherein said outlet means includes a controllable gate and a container conveying duct.

27. A device according to claim 20, wherein said outlet means include outlets for non-acceptable objects or containers of any material, to be delivered back to a customer operating the device.

28. A device according to claim 20, wherein in said means for rotating said revolver-type barrel includes motor means, gear means interconnecting the motor means with rotatable disc means, said disc means having a first circle-segment member coaxially and fixedly attached thereto and a second circular member pivotally attached to said disc means, and a toothed gear wheel shaped like a maltese cross having a plurality of shallow recesses each for slidably engaging said first member when adjacent thereto, and a plurality of deep recesses alternating with said shallow recesses, each of said deep recesses in turn engageable with said second member for advancing said barrel in steps, and said shallow recess and first member retaining the barrel stationary between such step movements.

29. A device for handling empty beverage containers, comprising
 a rotatable revolver-type barrel with a plurality of container receiving compartments therein, said revolver-type barrel having an axis of rotation at an acute angle to the horizontal, means for rotating said revolver-type barrel about said axis of rotation, inlet means for entering a container into a compartment means for detecting characteristic features of said containers at one or more positions during rotation of said revolver-type barrel, means for comparing said detected features with predetermined feature data and to provide control signals as function thereof, one or more outlet means for discharging a container based on said control signals, means cooperating with at least one of said outlet means for volume reduction of a container leaving said outlet means, and said comparing means including processing means for calculating and providing a possible redemption value for said container.

30. A device according to claim 29, including means for detecting one or more features selected from the group consisting of container shape, container dimensions, type of material, colour of the material, code indicia located on the container surface, code indicia embedded within the container material, spurious elements within the container, and combinations thereof.

31. A device according to claim 29, wherein said revolver-type barrel has a front face, a rear face and a circumferential surface with compartment apertures, said front face having located in front thereof first means for shielding said revolver-type barrel front face and with a container inlet hole located in said first shielding means, said rear face having second means for shielding the rear of said revolver-type barrel and with one or more holes in said second shielding member cooperating and aligned with said outlet means, and said circumferential surface having an adjacent wall section extending over at least the lower 180° of said surface.

32. A device according to claim 29, wherein said container receiving compartments at a region thereof adjacent to the axis of the revolver-type barrel are open, wherein a stationary wall is located at an upper half section of the revolver-type barrel and forms a wall for said container receiving compartments at said regions thereof in said upper half section of the revolver-type barrel, and wherein said stationary wall forms an angle with the axis of the revolver-type barrel.

33. A device according to claim 29, wherein said means for detecting being located at a centre region of the revolver-type barrel and capable of detecting a container through an open region of said container receiving compartments as they pass through a region below the axis of rotation of said revolver-type barrel.

34. A device according to claim 29, wherein said means for detecting being located at the inlet means.

35. A device according to claim 29, wherein said outlet means includes a controllable gate and a container conveying duct.

36. A device according to claim 29, wherein said volume reduction means includes a spring loaded peg fired transversely of the container.

37. A device according to claim 29, wherein said outlet means include outlets for non-acceptable objects or containers of any material, to be delivered back to a customer operating the device.

38. A device according to claim 29, wherein in said means for rotating said revolver-type barrel includes motor means, gear means interconnecting the motor means with rotatable disc means, said disc means having a first circle-segment member coaxially and fixedly attached thereto and a second circular member pivotally attached to said disc means, and a toothed gear wheel shaped like a maltese cross having a plurality of shallow recesses each for slidably engaging said first member when adjacent thereto, and a plurality of deep recesses alternating with said shallow recesses, each of said deep recesses in turn engageable with said second member for advancing said barrel in steps, and said shallow recess and first member retaining the barrel stationary between such step movements.

39. A device according to claim 1 further including an immovable surface at a predetermined peripheral portion of said rotatable revolver-type barrel to engage with a container in a predetermined receiving compartment of said rotatable revolver-type barrel to cause rotation of the container in the predetermined receiving compartment as the predetermined receiving compartment moves relative to said immovable surface during rotation of said revolver-type barrel about said axis of rotation.

40. A device according to claim 10 further including an immovable surface at a predetermined peripheral portion of said rotatable revolver-type barrel to engage with a container in a predetermined receiving compartment of said rotatable revolver-type barrel to cause rotation of the container in the predetermined receiving compartment as the predetermined receiving compartment moves relative to said immovable surface during rotation of said revolver-type barrel about said axis of rotation.

41. A device according to claim 20 further including an immovable surface at a predetermined peripheral portion of said rotatable revolver-type barrel to engage with a container in a predetermined receiving compartment of said rotatable revolver-type barrel to cause rotation of the container in the predetermined receiving compartment as the predetermined receiving compartment moves relative to said immovable surface during rotation of said revolver-type barrel about said axis of rotation.

42. A device according to claim 29 further including an immovable surface at a predetermined peripheral portion of said rotatable revolver-type barrel to engage with a container in a predetermined receiving compartment of said rotatable revolver-type barrel to cause rotation of the container in the predetermined receiving compartment as the predetermined receiving compartment moves relative to said immovable surface during rotation of said revolver-type barrel about said axis of rotation.

* * * * *